United States Patent

Tveter

[11] Patent Number: 5,701,740
[45] Date of Patent: Dec. 30, 1997

[54] DEVICE FOR A BUOY-BASED WAVE POWER APPARATUS

[76] Inventor: Torger Tveter, N-2100 Skarnes, Norway

[21] Appl. No.: 411,712

[22] PCT Filed: Sep. 23, 1993

[86] PCT No.: PCT/NO93/00140

§ 371 Date: Apr. 7, 1995

§ 102(e) Date: Apr. 7, 1995

[87] PCT Pub. No.: WO94/09273

PCT Pub. Date: Apr. 28, 1994

[30] Foreign Application Priority Data

Oct. 9, 1992 [NO] Norway ................................ 923946

[51] Int. Cl.⁶ ............................................... F03B 13/12
[52] U.S. Cl. ........................ 60/505; 60/497; 60/499; 417/331
[58] Field of Search ..................... 60/505, 497, 498, 60/499, 500, 501, 502, 503, 504, 506, 507; 417/331, 332, 547

[56] References Cited

U.S. PATENT DOCUMENTS

| 644,093 | 2/1900 | Place. |
|---|---|---|
| 3,515,889 | 6/1970 | Kammerer. |
| 4,076,463 | 2/1978 | Welczer. |
| 4,218,192 | 8/1980 | West. |
| 4,742,241 | 5/1988 | Melvin. |
| 5,179,837 | 1/1993 | Sieber. |

FOREIGN PATENT DOCUMENTS

WO8103358  11/1981  WIPO.

Primary Examiner—Ira S. Lazarus
Assistant Examiner—Alfred Basichas

[57] ABSTRACT

A device for buoy based wave power apparatus, where the buoy (30) coacts with a cylinder piston arrangement which is connected to the sea bed, and where the arrangement is provided with the valve means (34, 35) enabling fluid flow through a piston (32) and possibly a piston rod (33) in said arrangement, a pressure being formed in one chamber (37) of the arrangement during the upward movement of the buoy (30) and simultaneously a suction via a snorkel or via focusing conduits/means (30', 44, 47) into that part of the cylinder which is adjacent the top face of the piston and which forms a second chamber (36). The piston rod (33) has mounted thereon a submarine buoy (29) or a sink member (80) and is articulated or flexibly (46) connected to a sea bed base member (40, 81). The cylinder (31) may be fixedly or articulated (68) connected with the buoy (30, 55, 67). The buoy (30) is provided with a cavity/vessel (42) receiving water upon bigger waves, and being drained through self-drainage conduits (43) during the return of the buoy into the trough of the wave. A linear induction generator can be arranged at the slide movement between an extended piston rod (85) and a guide tube (87) therefor which is arranged on the buoy (86).

37 Claims, 13 Drawing Sheets

DEVICE FOR A BUOY-BASED WAVE POWER APPARATUS

The present invention relates to a device for a buoy-based wave power apparatus, where the buoy coacts with a cylinder/piston arrangement which is connected to the sea bottom, and where the arrangement is provided wit valve means allowing fluid flow through a piston and possibly a piston rod in said arrangement.

U.S. Pat. No. 4,218,192 discloses a device of said type where liquid may flow through piston and piston rod and where the production equipment proper is located within the buoy, and outside flexible hose being arranged for recirculation of the liquid flowing in a closed system. The pressure establishment is made on the top side of the piston. The device produces energy only at downward stroke caused by the heavy weight of the buoy. The construction is firmly anchored to the sea bottom, and can not submerge in bad weather, which makes it quite vulnerable to damages and in addition wear at the lead-through of the piston rod into the cylinder. A specific problem related to the know device is also that generated energy is brought ashore by means of an electric cable attached to buoy. This cable will therefor be subjected to great dynamic stresses, and is vulnerable to damage or complete breakdown.

For further elucidation of the prior art it is referred to U.S. Pat. No. 4,742,241 which discloses an embodiment with a flow-through of liquid in piston and piston-rod, the piston-rod being fitted to a fixed frame at both ends and where a plurality of cylindrical buoys are operating in the same frame system. The piston rod extends through both inflow and pressure chamber. There is in addition installed a specific type of valve control means in the piston.

U.S. Pat. No. 4,914,915 relates to a sea bed fixed installation with liquid flow-through through a turbine located within the piston. The piston-rod is here working as compact rotation shaft connected to a generator located at the top of the installation. The buoy is located externally of the cylinder and is movable up and down therealong, which causes the generator and turbine as well as the piston to move simultaneously with the buoy. The device implies an extensive concrete structure extending from the sea bed and well above maximum wave height. The installation must therefore at any time extend well above the sea surface, and the buoy is designed to have a roller connection with the inside of the cylinder face of the concrete structure.

British patent 1478312 relates to a device having a buoy which via a universal joint is connected to a cylinder/piston arrangement, where water can be pumped out from the top or bottom of the cylinder during movement of the buoy. The cylinder is in addition anchored to the sea bed in a non-turnable fashion.

For further elucidation of the prior art relating to wave-power apparatus and anchoring systems of constructions below water, it is referred to WO81/03358 (PCT/GB80/00091) and Norwegian patent application No. 850602 and Norwegian patent No. 148650.

Neither of the prior art embodiments have been able to present a wavepower apparatus which is characterized by an inexpensive and simple production, suitable installation and good possibilities for convenient demounting in connection with repair work. The system is easy to adapt to different fields of use, e.g. for making pressurized air, lifting of water, production of electric current, pressure making through the liquid-osmosis principles, forming of sound (e.g. by pressurized air), light-buoys etc.

The characteristic features of the invention will appear from the subsequent patent claims and from the subsequent description with reference to the enclosed drawings which show with regard to the invention non-limitative embodiments of the device according to the invention.

Figure 1:
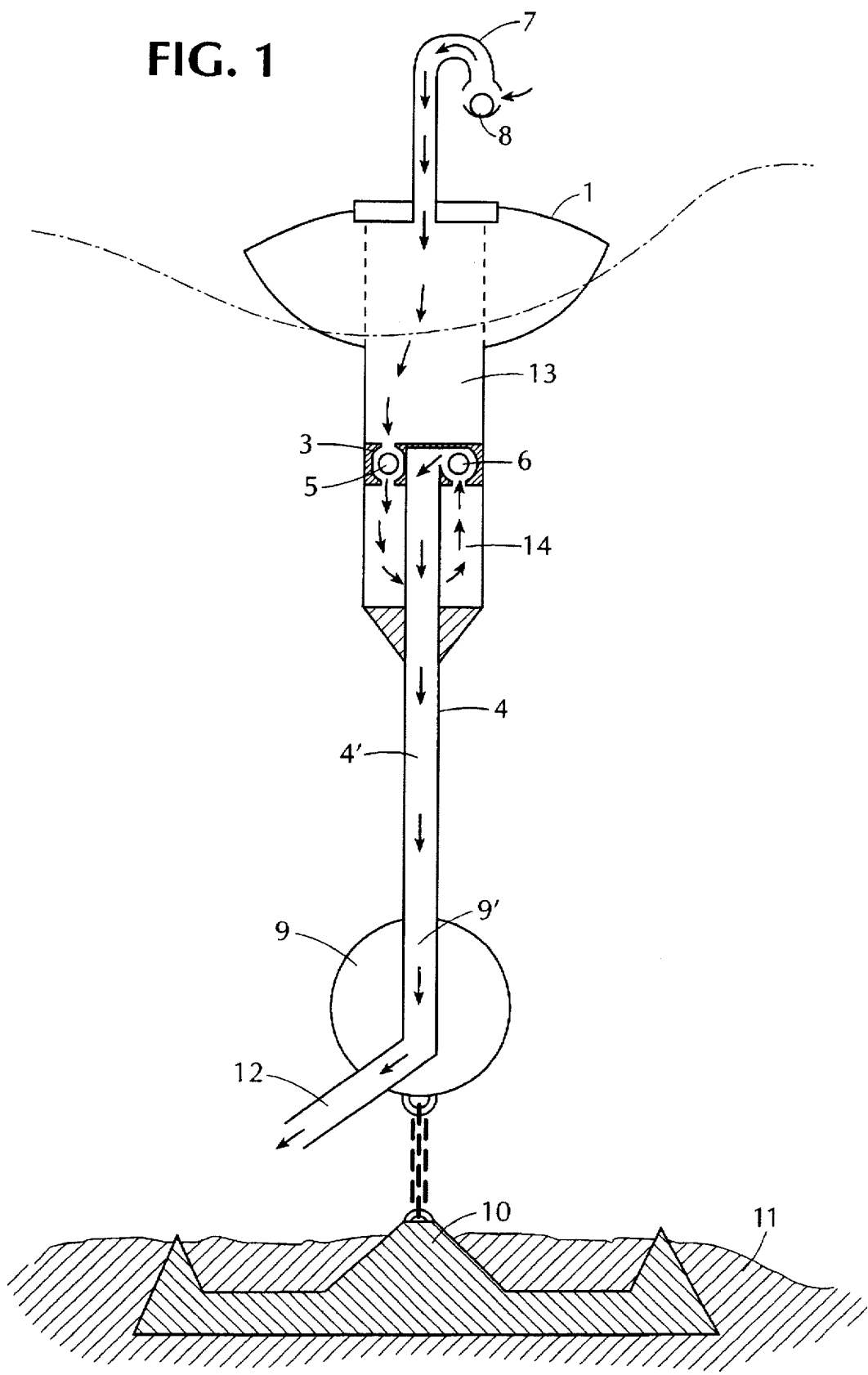
FIG. 1 shows a first embodiment of the device according to the invention.

FIG. 1 shows in section a buoy 1 with a cylinder 2 surrounding a piston 3 and a piston rod 4. Back-pressure valves 5, 6 are mounted within the piston and serve to compress fluid, in this case illustrated by air input iva a snorkel 7, the snorkel being provided with an input valve 8 closing if the snorkel comes below water. The piston rod 4 has an internal conduit 4' communicating with the back-pressure valve 6 in the piston 3. By using liquid, the valve 5 functions without spring loading by letting the ball has buoyancy. The ball 6 will sink. In addition, the balls of the valves will keep the respective ball seat clean from growing seaweed. At the lower end, the piston-rod 4 is connected to a submarine buoy 9. The submarine buoy 9 is connected to a base member 10 located on the sea bed 11 via a flexible connection, e.g. wire, chain or other articulated connection 9". The conduit 4' in the piston-rod is via a connection 9' at or in the submarine buoy connected to a hose 12 for bringing fluid (in the elected example: air) ashore to e.g. a land installation, e.g. to run a generator.

When the buoy moves upward, the cylinder chamber 14 (pressure chamber) decreases in volume and presses the fluid through the back-pressure valve 6 and out through the piston rod 4. Simultaneously, fluid is sucked in to the chamber 13 which upon the downward stroke of the buoy 1 and cylinder 2 sucks the fluid through the back-pressure valve 5 in the piston and into the volume increasing compression chamber 14, in order to upon a next upward stroke to be compressed, i.e. form pressure.

Figure 2:
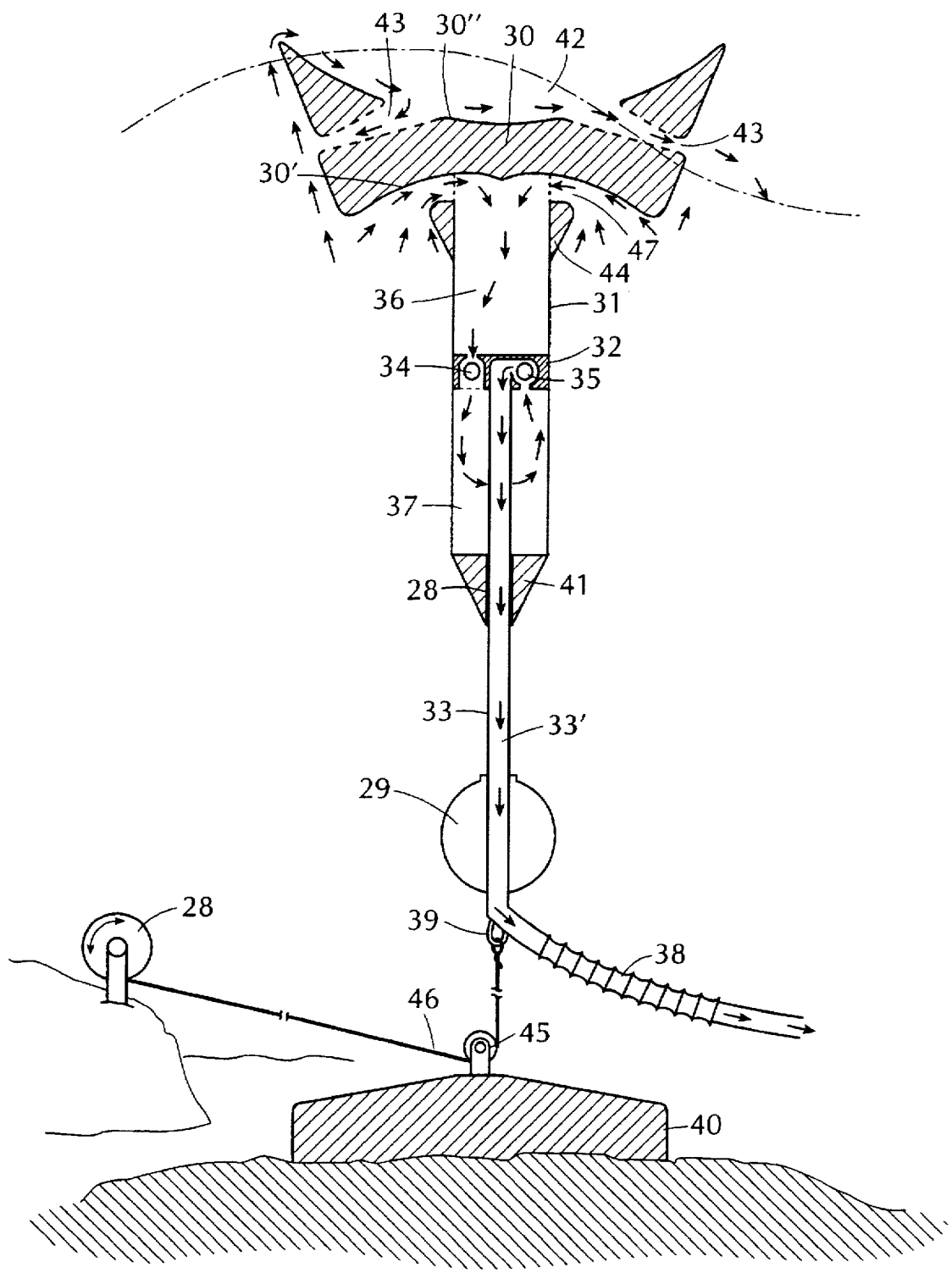
FIG. 2 shows a second embodiment of the device according to the invention.

FIG. 2 is a second embodiment of the invention and shows in section a buoy 30 which is connected to a cylinder 31 surrounding a piston 32 and a piston rod 33. At the bottom end of the cylinder 31 at the lead-through 28 of the piston rod, there is in-moulded an adjusted weight 41 to let the center of gravity of the buoy/cylinder 30, 31 to be concentrated at the bottom 41 of the cylinder 31. Back-pressure valves 34, 35 are built into the piston 32 and serve to allow flow-through and compression of fluid, in this case illustrated in the form of water, input via focusing slots, holes and/or conduits 47 in the upper part 31 of the cylinder where focusing means 44 have been mounted thereon to contribute to press water into the suction chamber 36 of the cylinder 31. It should be understood that the focusing slots, the holes and/or conduits and the means 47, 44 can be arranged in the buoy 30 and/or on the cylinder 31.

The piston rod 33 has an internal conduit 33' communicating with back-pressure valve(s) 35 in the piston 32 and with the pressure chamber 37. The valve(s) 35 function by adjusted sinking weight. The return valve(s) 34 function by means of adjusted buoyancy. Upon inlet of air, the valve(s) 34 must either be spring biased or the conduit must be constructed like a water trap conduit where the ball seals by means of its return weight.

At the bottom, the piston rod 33 is lead through a submarine buoy 29 firmly located around the piston rod 33, and at the lower end of the piston rod 33 there is arranged an attachment 39 for a flexible connection, wire, chain or other articulated connection down to a base member/anchor 40 on the sea bed. The anchor 40 can be provided with a block-sheave 45 through which a wire 46 communicates with the attachment 39 and e.g. a landbased winch 28.

From the lower end of the piston rod 33 there is arranged a flexible hose 38 serving to carry away pressurised fluid from the device to e.g. a seabased or landbased energy converting equipment, or for other use of the pressurized fluid.

When the buoy 30 moves upward, the pressure chamber 37 will decrease in volume and press fluid through the back-pressure valve(s) 35 and out through the piston rod 33'. Simultaneously, fluid is sucked into the chamber 36 which upon the downward movement sucks fluid through the back-pressure valve(s) 34 in the piston 32 and into the volume increasing compression chamber 37 in order to upon next upward stroke to be compressed, i.e. form pressure.

At the transition 30' between the buoy 30 and the cylinder 31, where inflow of water takes place, the buoy part 30 is constructed like an open umbrella in which said slots, holes and/or conduits and focusing means 30', 47, 44 focus and accelerate the water flow into the inlet chamber 36 when the wave moves upward along the outside cylinder wall 31.

In order to secure the quickest possible return of the buoy/cylinder 30, 31 after upward stroke, the surface 30" of the buoy is constructed such that when waves wash over the buoy, water is filled in container(s)/cavities 42 in the buoy, the weight of which contributes to a quick return (phase control) of the buoy/cylinder 30, 31. As the buoy 30 returns down in the next through of the waves, the water which has been let in flows back to the sea by means of a self draining conduit system 43, so that the cavity 30" of the buoy is emptied and made ready for a next listing. This system also contributes to preventing of breakdown in that the pulling force of the buoy is neutralized when the container is filled with water.

Figure 3:
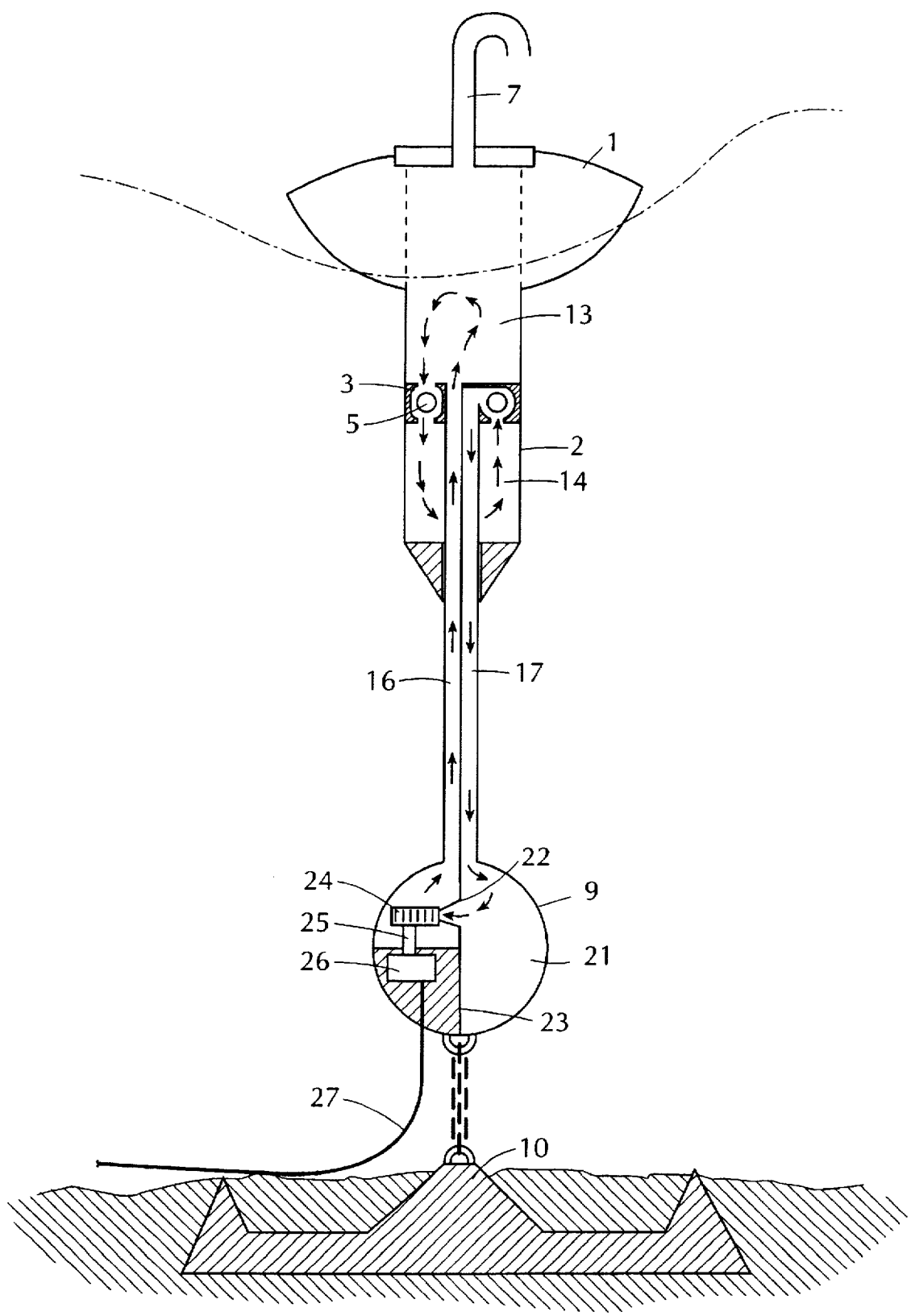
FIG. 3 shows a third embodiment of the device according to the invention.

FIG. 3 is a variant of the embodiment of FIG. 1 and represents a third embodiment of the device according to the invention.

This embodiment likewise includes elements appearing from the embodiment of FIG. 2, but represent here a recirculation system. The snorkel 7 represents here a ventilation pipe for maintaining atmospheric pressure in the chamber 13. When the buoy 1 moves downward, the volume of the chamber 13 will decrease, whereas the volume of the chamber 14 will increase. The fluid, in this case e.g. air, will flow in through the back-pressure valve 5 and fill the chamber 14.

When the buoy moves upward due to wave movement, the chamber 14 will decrease in volume, whereby fluid is pressed down through the conduit 17 into a pressure vessel 21 in the submarine buoy 9 in through a nozzle 22 in a partition 23, where the nozzle(s) lead to a turbine wheel 24, so that the pressurized fluid operates the turbine wheel. The turbine wheel is via a shaft connected to a generator 26 which via a cable 27 provides e.g. a landbased installation with current. The air leaving the turbine 24 is fed via the conduit 16 back to the chamber 13. This system can also operate with liquid in a closed system.

Figure 4:
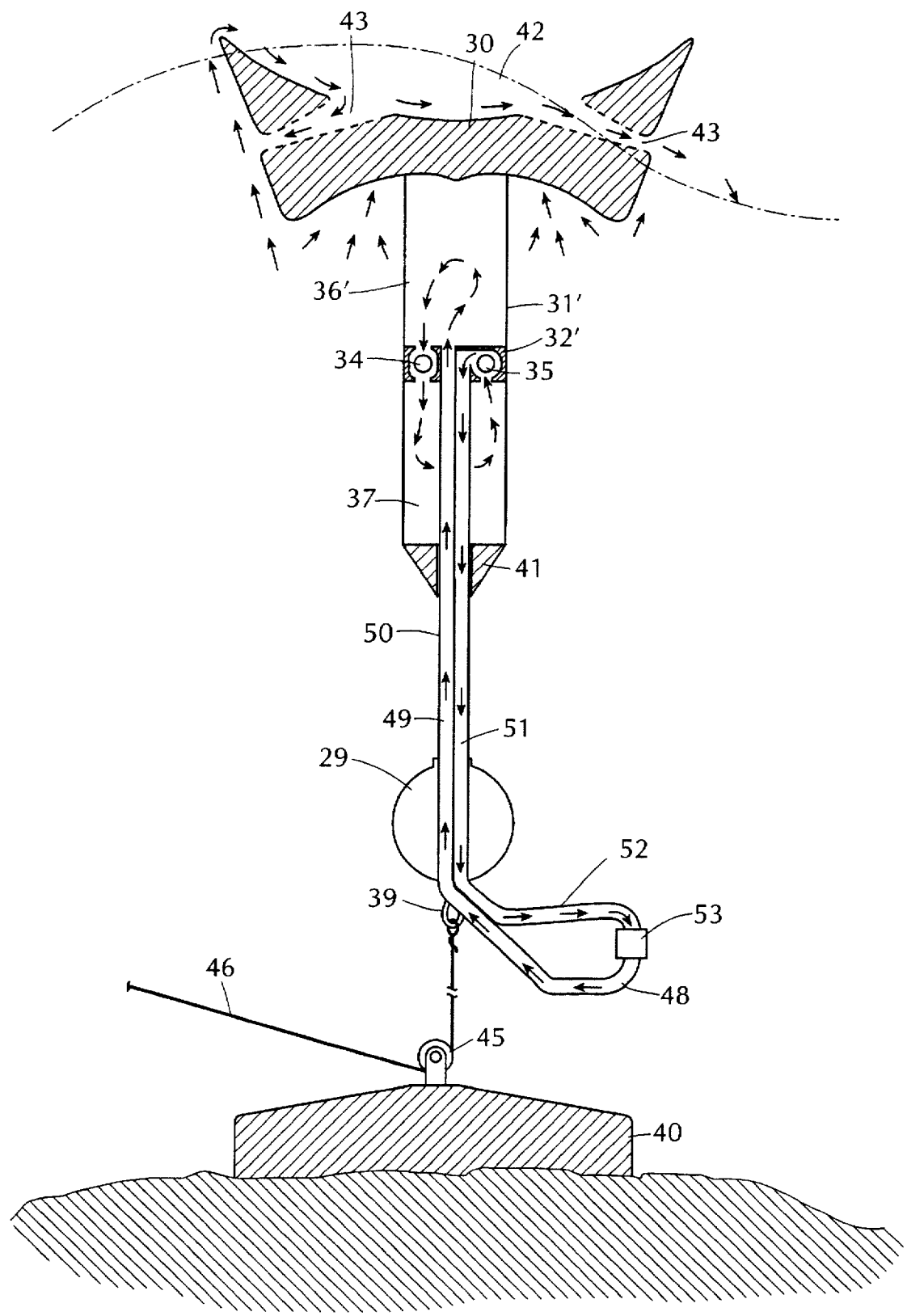
FIG. 4 shows a fourth embodiment of the device according to the invention.

FIG. 4 shows a fourth variant of the invention. The operation is per se like that of FIG. 3, with exception that the fluid supply here takes place via a hose 48 where the fluid flows via a conduit 49 in the piston rod 50 and into the suction chamber 36', whereas fluid is pressed out through the pressure chamber 37 via a conduit 51 in the piston rod 50, said conduit 51 being separate from the conduit 49, and via the submarine buoy 29 and further through a hose 52 leading to converting equipment 53 arranged at any distance from the piston rod 50.

Figure 5:
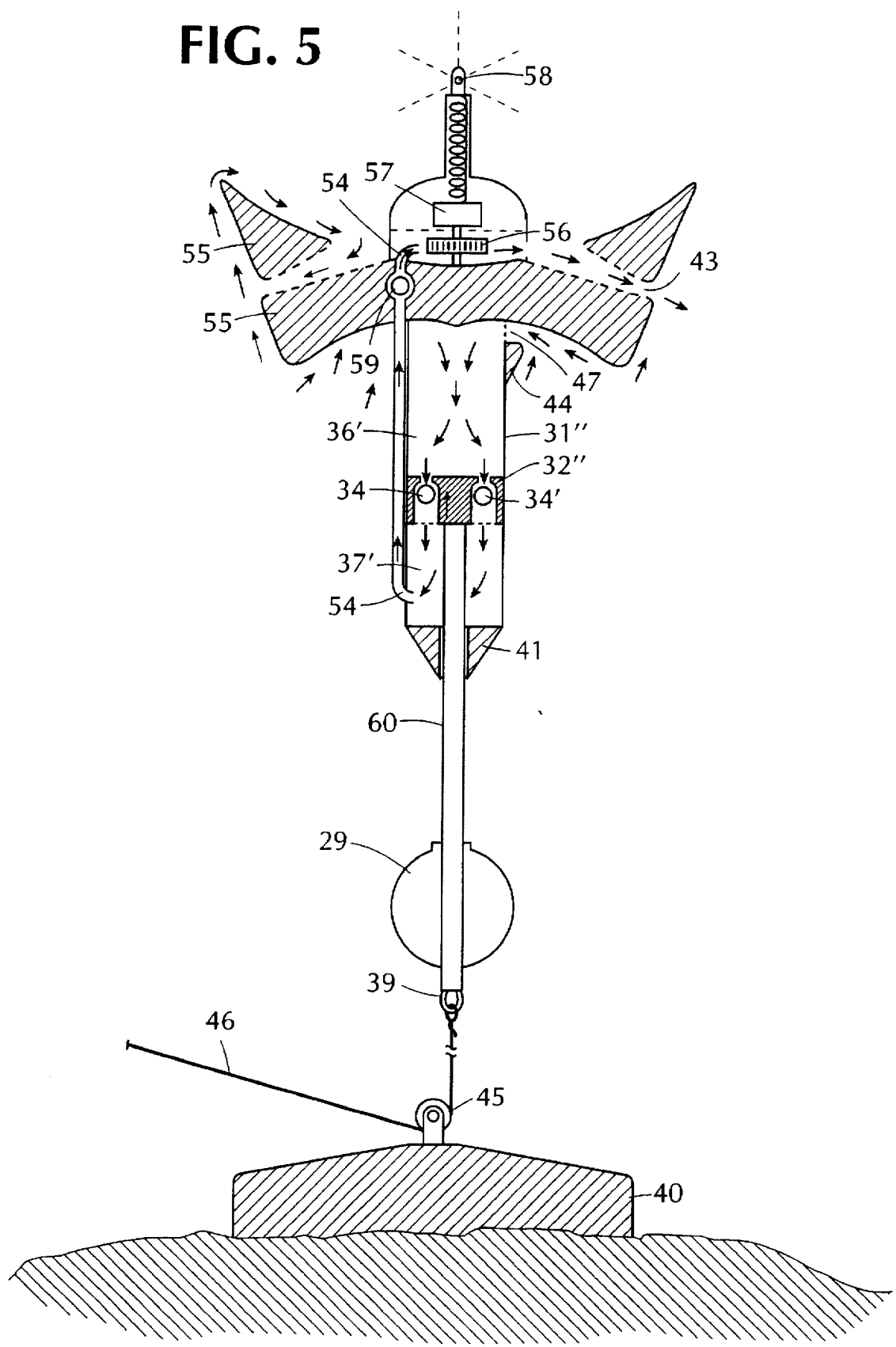
FIG. 5 shows a fifth embodiment of the device according to the invention.

FIG. 5 shows a fifth embodiment according to the invention, here shown as a light buoy. FIG. 5 is a variant of the embodiment in FIG. 2 and the operation is like that of FIG. 2, with the exception that the pressurized fluid flows out from the pressure chamber 37' via a pipe 54 which is located externally of the cylinder 31" and which extends from the bottom of the pressure chamber 37' and up to the buoy 55, where the pressure is led through energy converting equipment, e.g. a water turbine generator 56, 57, producing electric current to e.g. a light device 58 on the buoy 55. The back-pressure valve 35 in FIG. 2 is here replaced by the back-pressure valve 59 which is located in the pressure pipe 54 in connection with the buoy 55. The valves 34 have here equal function. The piston rod 60 is in this variant not conducting fluid. It should be understood that this variant can be adapted to the remaining variants as a supplementary function thereof.

Figure 6:
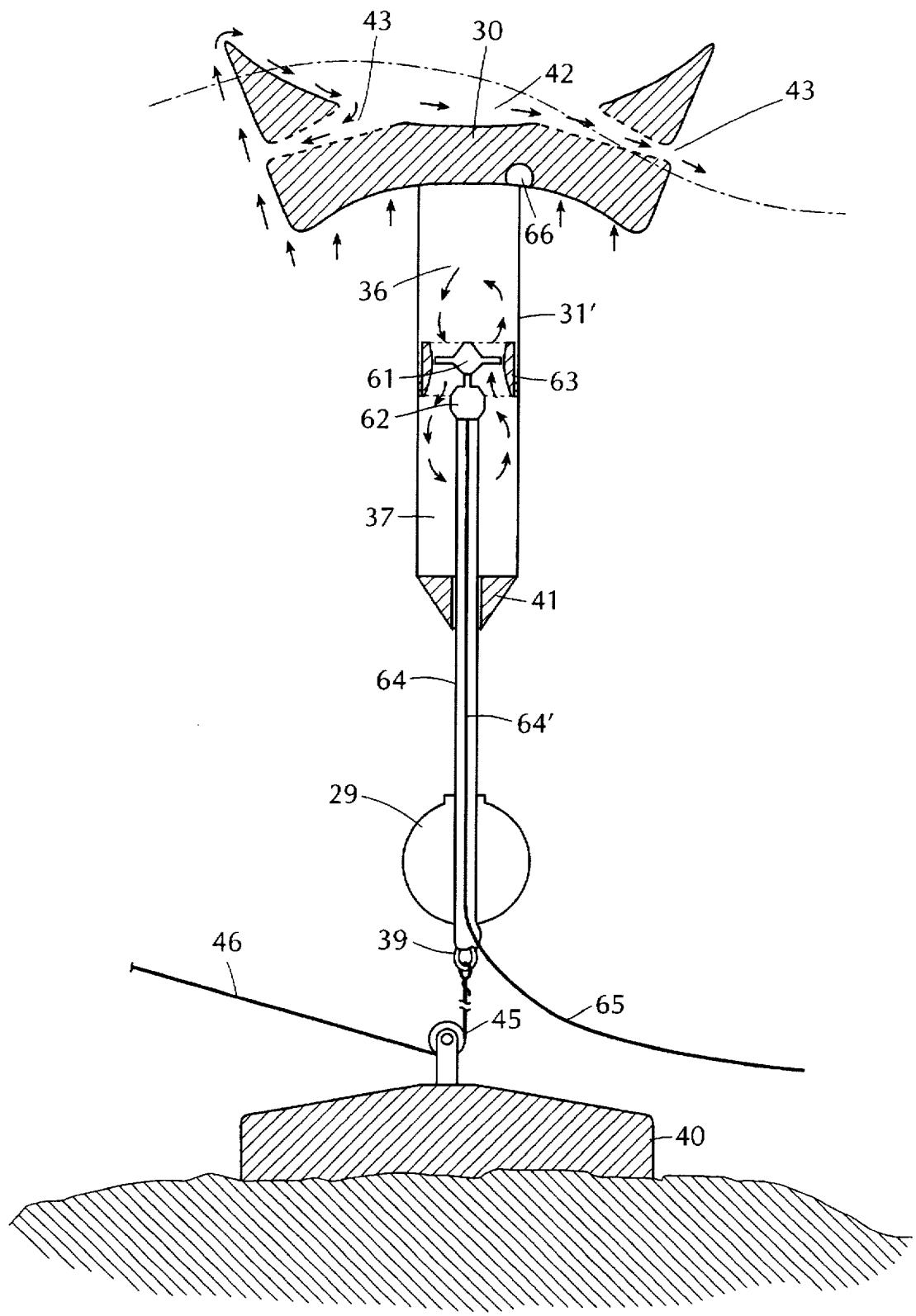
FIG. 6 shows a sixth embodiment of the device according to the invention.

FIG. 6 is a variant of the device in FIG. 1, and shows a different piston function than that shown in the other embodiments. FIG. 6 is energy converting equipment in the form of a turbine generator 61, 62 located in the piston 63 and the piston-rod 64. An electric-cable 65 is led from the generator 62 and out of the apparatus through the hollow-piston rod 64'. The blades of the turbine 61 have a passive pitch property, where the fluid influences the neutral position for alternate effect, such that the turbine 61 turns in the same direction independent of the direction of fluid flow. Some other forms of turbine and valve control of fluid thereto in the piston may also be used.

It may also be understood that desalination equipment operating by means of the principle of a reverse osmosis, can be arranged in the piston or piston rod, purified water being transported ashore via the piston-rod and saline water carried back to the sea.

Figure 7:
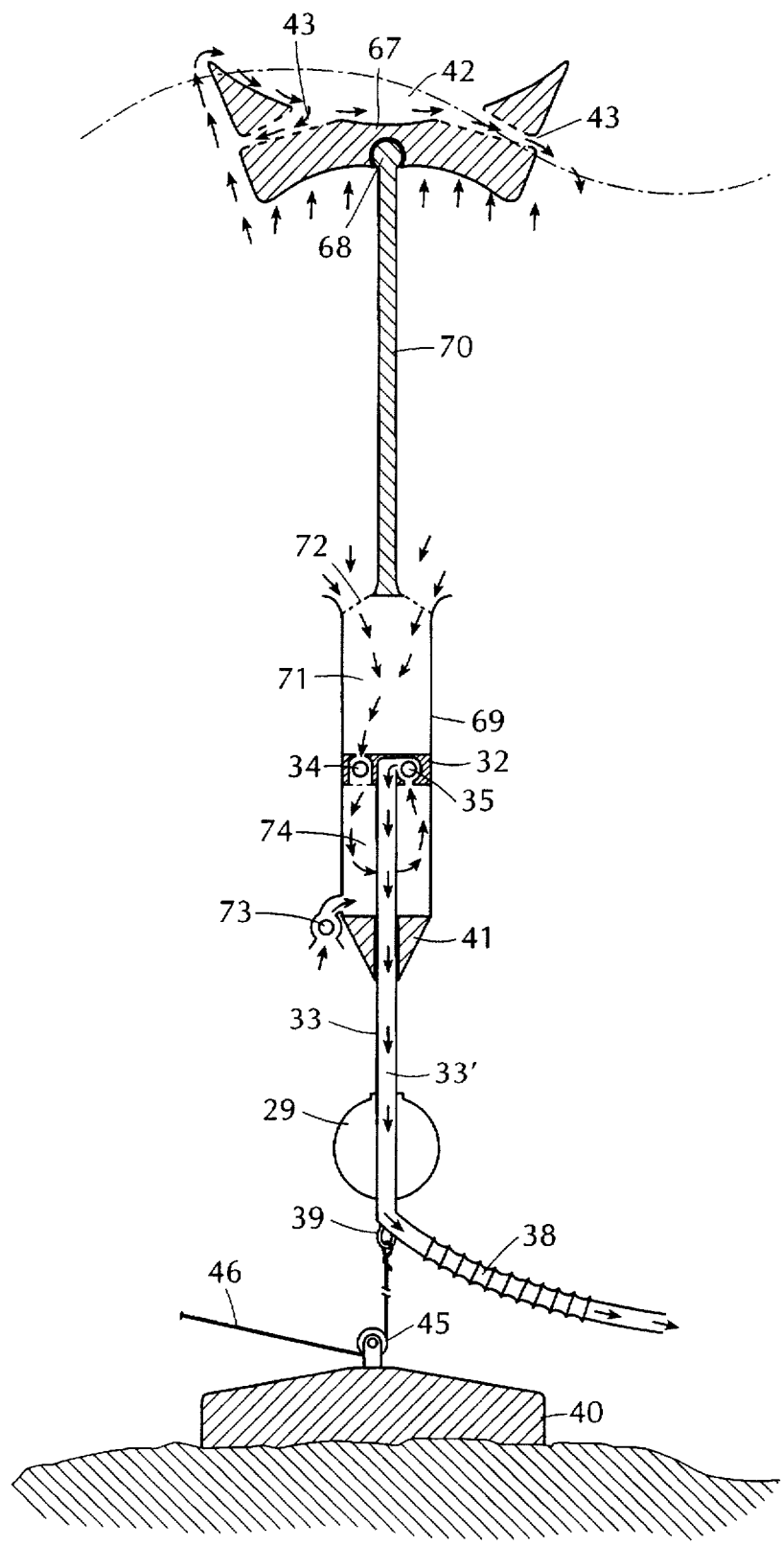
FIG. 7 shows a seventh embodiment of the device according to the invention.

FIG. 7 shows a variant of the device as shown in FIG. 2, and represents a seventh embodiment of the invention. This variant is relevant in the case of pumping deep-water up to e.g. a fish-farming installation. The piston function is like that of FIG. 2, but in this variant the buoy 67 is firmly or articulated 68 connected to the cylinder 69 by means of a rod 70 or a flexible connection. Inflowing fluid is focused into the suction camber 71 upon the upward movement of the cylinder 69 through focusing apertures/conduits 72 opening into the suction chamber 71. In this variant, there is also shown an extra valve 73 arranged at the bottom of the cylinder chamber 74 for direct inlet of water to the chamber 74 upon the downward movement of the cylinder 69.

Figure 8:
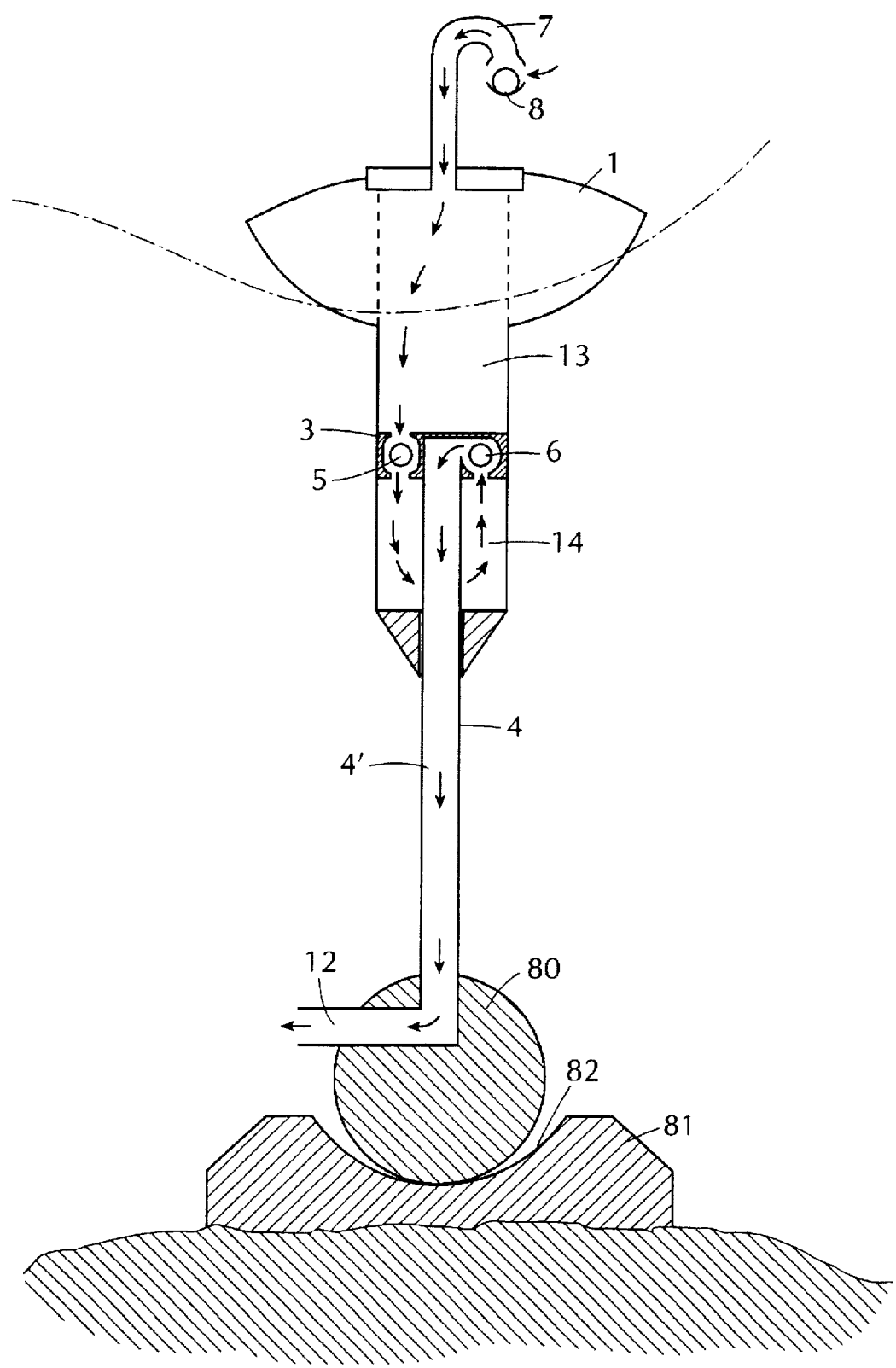
FIG. 8 shows a eighth embodiment of the device according to the invention.

Further, FIG. 8 shows an eight embodiment of the invention. This device has a pump function like that shown in FIG. 1 and the technical functioning is therefore not to be further explained. The difference between FIGS. 1 and 8 consists in that the submarine buoy has been replaced by a sink weight or a ballast (which must be heavier than the maximum buoyancy of the buoy), here denoted by reference numeral 80, being spherical in the bottom facing part and intended to roll forward and backward in a bed 82 in base member 81. The bed 82 has a greater radium of curvature than the sink weight member 80. This solution means that instead of using chain, wire or the like 9" as in FIG. 1, the base member 81 can be positioned on the sea bed, whereafter the device, including the sink weight member 80 is placed in the recess 82, such that the wave power apparatus is able to tilt forward and backward relative to the base member 81 without the risk of drifting away from the base member 81. This provides a 360° freedom of movement at the surface, i.e. that the device upon its movement almost represents a generatrix for an inverted cone, where the apex of the cone is located in the ballast. It should also be understood here that the piston rod 33, 50, 60, 64 may be directly connected to a bottom base member via an universal joint, e.g. a ball joint or directly to a bed in connection with a wire sheave which is located on or in the bottom base member.

Figure 9:
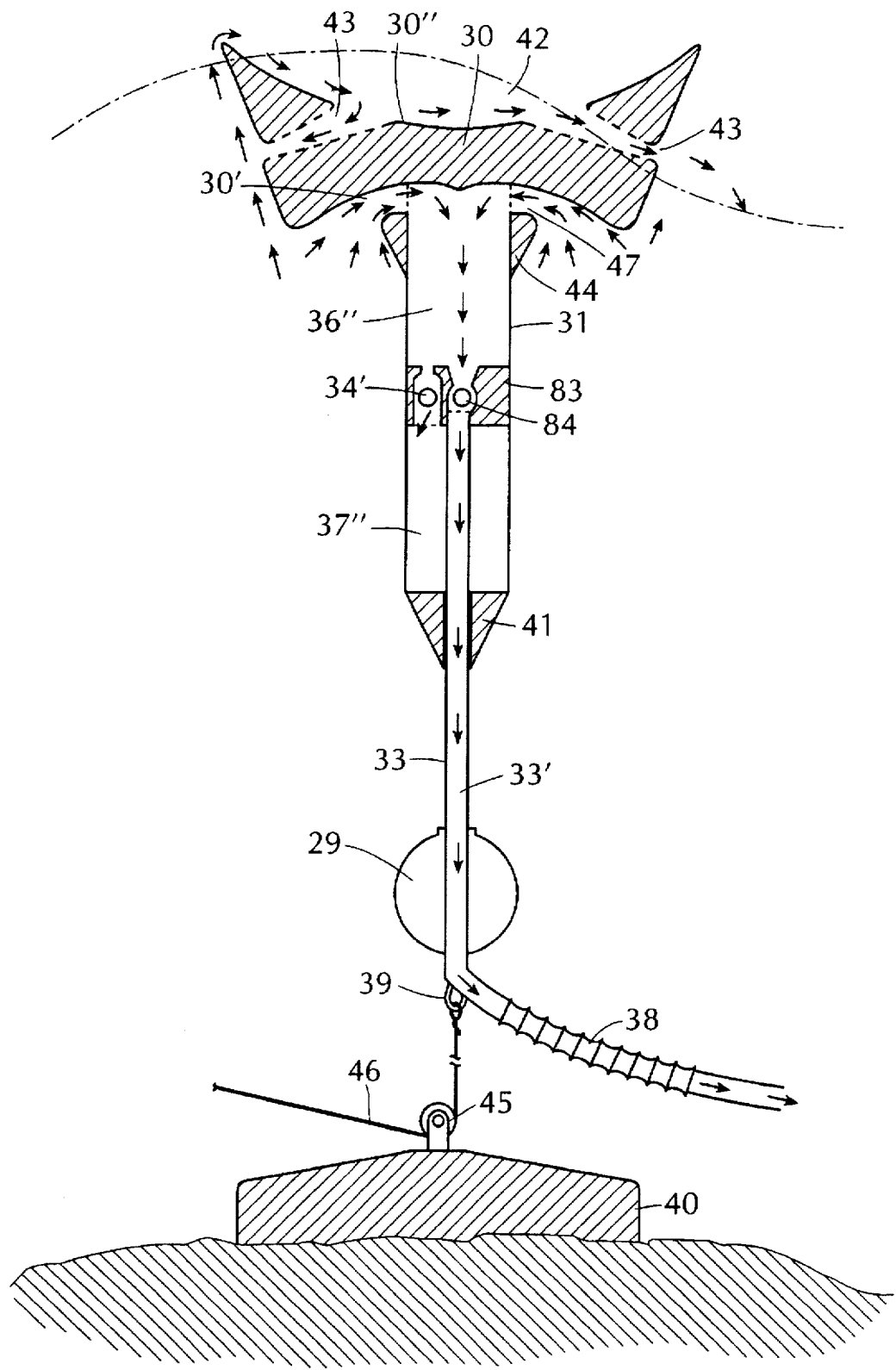
FIG. 9 shows a ninth embodiment of the device according to the invention.
Figure 13:
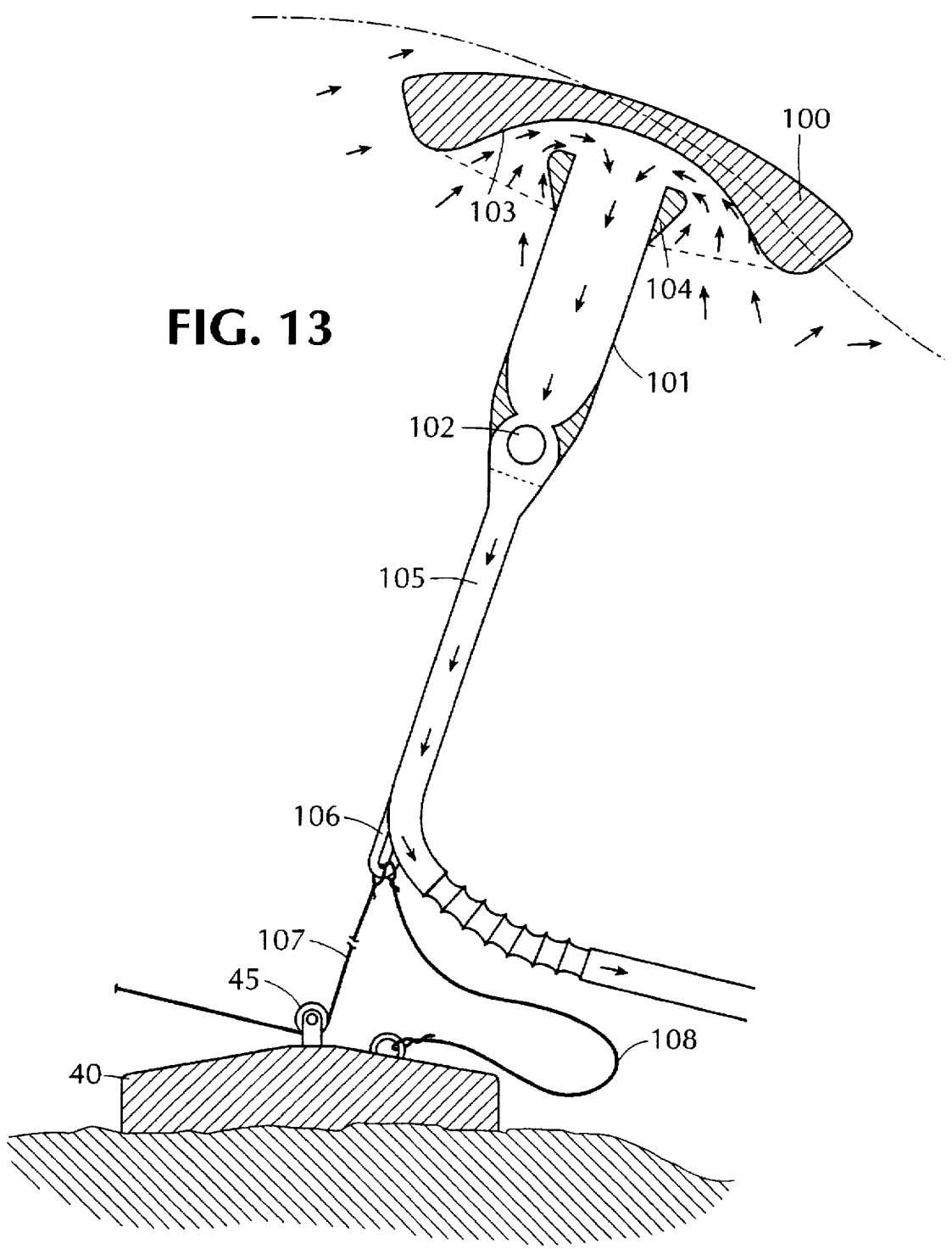
FIG. 13 shows a modification of FIG. 9.

FIG. 9 is a variant of the device shown in FIG. 2, where the piston function is different. In FIG. 9 the chamber 37' only functions as an adaptation chamber for flood tide and ebb tide. The back pressure valve 34' operates to control the liquid level in the chamber 37" which represents a counter pressure against the buoyancy of the buoy 30. By means of a small fluid passage between the cylinder 31 and the piston 83, the buoy/cylinder 30, 31 will automatically adapt to flood tide and ebb tide. The pressure is created by focusing 47 the upward going water flow of the wave, which is driven into the chamber 36", here functioning as a pressure chamber, from which the pressure is led through the top of the piston 83 and directly into the piston rod 23'. The piston 83 and/or pipe 38 for transportation ashore is provided with a back-pressure valve 84. In the modification of FIG. 9 as shown in FIG. 13, the piston-, piston-rod and submarine buoy function is replaced by a pressure valve located in the bottom of the cylinder 101, said valve having a calibrated buoyancy ball 102 from which the pressure, formed at the focusing means 103, 104 is conveyed out of the device through a conveyance pipe 105 located at the bottom of the cylinder 101, the pipe 105 or possibly the cylinder 101 having attachment means 106 for the anchoring line 107 which according to this variant must have sufficient length in order that the buoy 100 is not constantly submarine.

Figure 10:
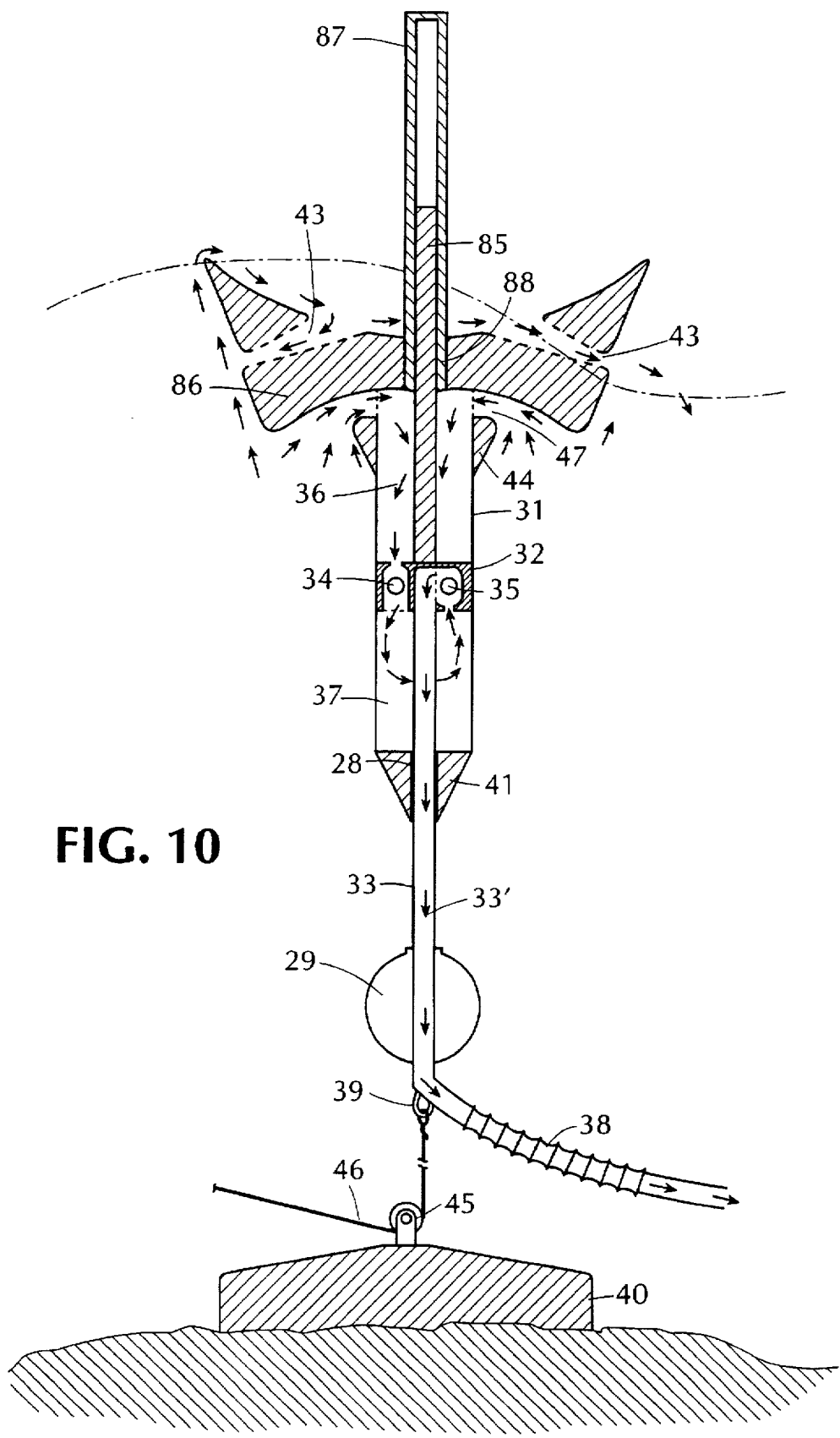
FIG. 10 shows a tenth embodiment of the device according to the invention.

FIG. 10 is a variant of the invention with the pump function identical to the embodiment of FIG. 2. In FIG. 10 there is in addition shown a piston rod 85 extended from the topside of the piston and which extends up through the buoy 86. A guide tube 87 for the piston rod 85 is arranged on the buoy 86, said tube having a sufficient length to accommodate the maximum stroke of the cylinder 31. There is arranged a linear induction equipment 88 between the piston rod 85 and the guide tube 87. The current which is created is fed either via the guide tube 87 to e.g. a signal device at the top end of the tube or from the extended piston rod 85 via the piston 32 and out through the fluid conveying pipe 33' to another installation.

Figure 11:
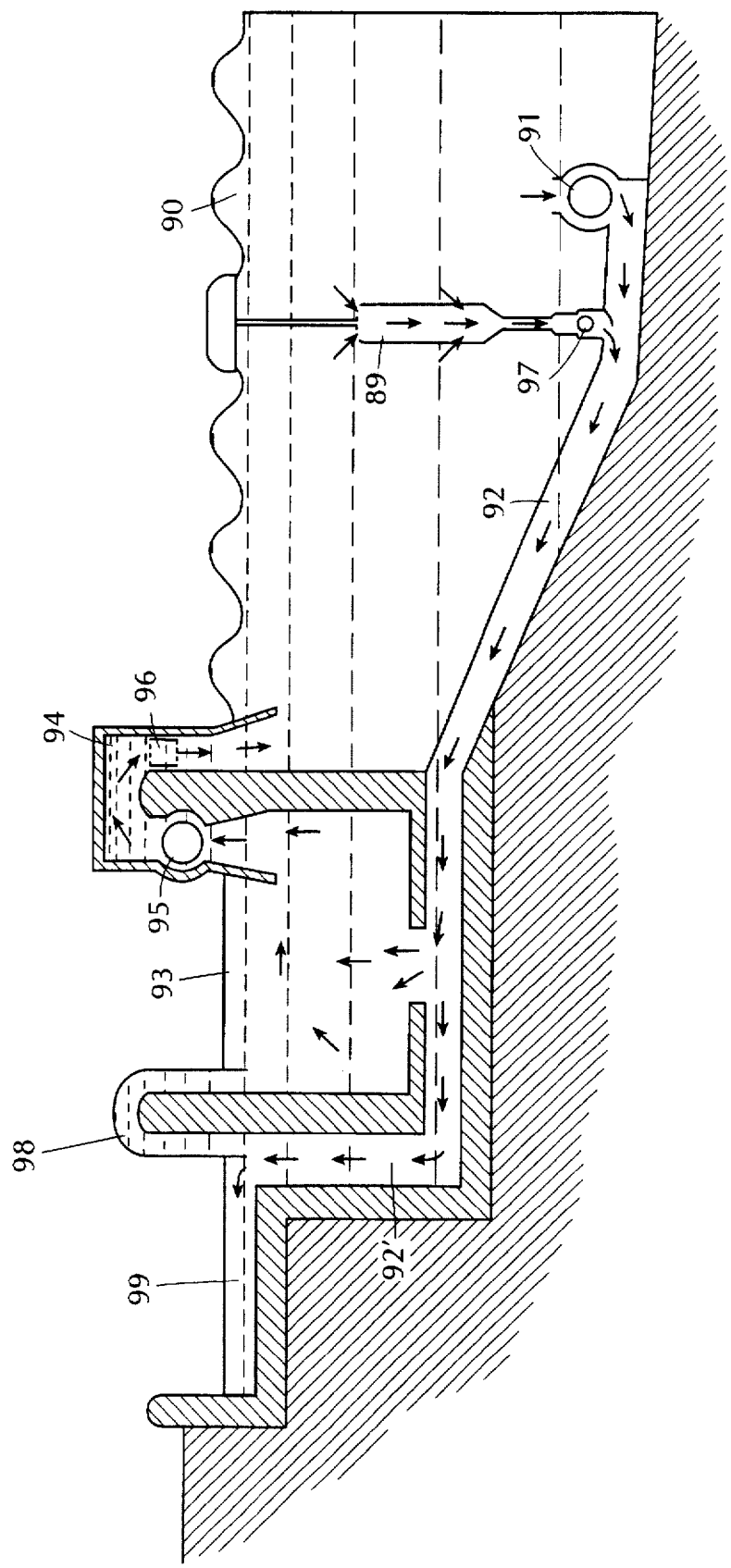
FIG. 11 shows a combined wave pump driven and tide driven circulation system through a reserve basin and a production basin at flood tide phase.

FIG. 11 shows a tidal water operated circulating system through a basin, e.g. a fish farming basin requiring deep-water. At the phase of flood-tide water is pressed to the basin 93 via a supply pipe 92 and the back-pressure valve 91, the tidal water flow being amplified by means of wave operated pumps 89, the pressure pipes of which are connected to the main pipe 92 via back-pressure valves 97. A siphon pipe 94 leads from the basin 93 back to the sea. The pipe has a turbine generator 96 which makes use of the return flow of water. At ebb-tide, water is sucked from the basin 93 through the siphon-pipe 94 back to the sea 90. Thus, there is obtained a one-way tidal water operated deep-water supply to the basin 93 and which is amplified by co-acting wave-pumps 89. The siphon-pipe 94 has a back-pressure valve 95.

In FIG. 11 where the arrows indicate the water flow at flood tide phase, there is also shown a reserve basin 99 which at flood tide phase is filled with deep-water via a common supply conduit 92, 92'. When the sea turns to ebb tide phase, fresh deep-water flows from the reserve basin 99 back to the basin 93 via a siphon conduit 98 and/or via the supply tube 92'.

Figure 12:
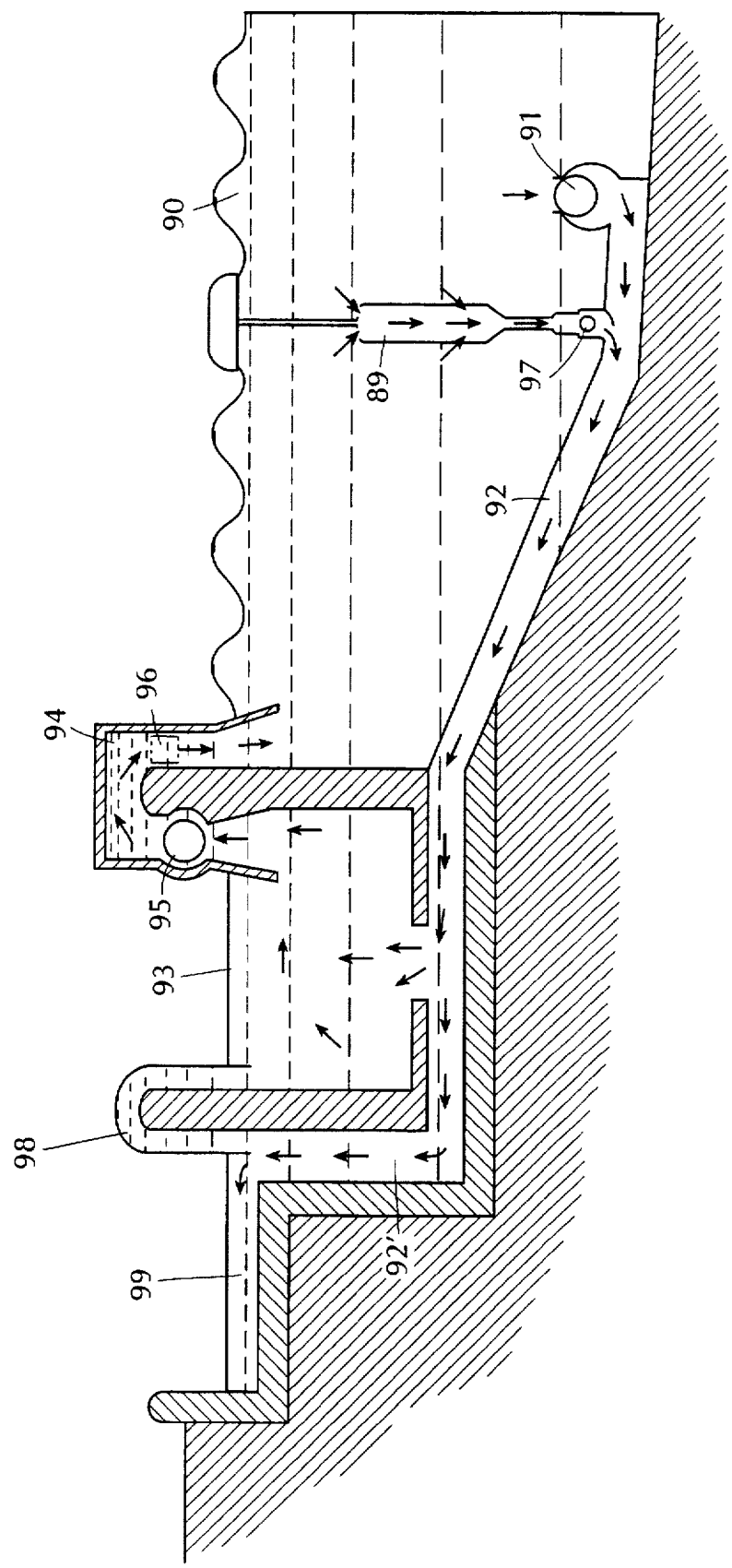
FIG. 12 shows the same system as in FIG. 11 at ebb-tide phase.

FIG. 12 shows the same system as FIG. 11, but the arrows indicate here the water flow at ebb-tide phase. At ebb-tide phase the back-pressure valve 91 will close because at this phase the pressure in the pipe 92 is higher than the pressure of the sea thereabout, i.e. only the wave pump(s) 89 being the pressure creative part at ebb-tide phase. It should also be appreciated that the valve 91 may close during periods of flood tide phase if the production caused by the wave pump(s), as a result of excellent wave activity, exceeds the pressure from the flooding sea.

The present device has a number of properties which are previously not know in connection with devices using wave power. It is simple and cheap for large volume production and all of the equipment can be premanufactured ashore. The use of divers is not required for installation and dismantling in the sea. Such work can be made from a vessel or from ashore by means of a landbased winch. Further, the device has a minimum of components subjected to wear and tear. The installation will be hardly visible and does not imply any conflict with nature. Thus, there is no limitation with regard to possible location in connection with any type of coastline and island community.

The system is also, upon adapted length of the cylinder, to a large extent suitable for self-adjustment to the tide level differences. In order to smooth pulsating production, it may be advantageous to use a flywheel for the converting equipment and/or to let two or more apparatus work on different wave frequencies.

With the type of sea bed anchoring which is shown and described, there is made possible a large extent of freedom of movement, which is imperative for the buoy based was power apparatus.

A condition for the shown device to counteract drift and function in a self-aligning toward approximately 90 degrees angle relative to the sea bed, is that the production pressure is created in the chamber surrounding the piston rod during the upward phase of the buoy, and that the buoy quickly returns in the downward phase. Another factor contributing to this self-regulating phase control is the location of the center of gravity of the buoy (the weight moulded therein) present in the bottom of the cylinder.

In the case of particular stresses, the use of buoy which is fixed relative to the cylinder, a certain side stress will be obtained at the slide joint between cylinder and piston rod. By using a universal joint between the buoy and cylinder, such stresses will to a large extent be compensated. A disadvantage, however, is the wear and tear on the joint.

The components of the device can be manufactured from sea water resistant materials such as e.g. polyethylene, stainless steel or the like. Relative to polyethylene, sea water behaves like lubricant means, and there is obtained in the piston a very simple and maintenance free conduit and valve structure when subjected to rotary casting or moulding of plastic material. The buoy part is also particularly suited for rotary casting and filled with foamed plastics material. These materials are light weight and cheap.

The buoy is so designed that it provides maximum buoyancy up to a given wave height and a given pressure in the cylinder, whereafter it is pulled down into the wave as a result of the buoy receiving water and that the production pressure equals the buoyancy. This contributes to the device being durable against damage.

A further advantage of the device, according to the present invention, is that it can be made to different scales ranging from "cottage size" for charging batteries, or desalination of seawater by e.g. reverse osmosis, to full scale with series connection of many pumps delivering pressurized fluid or converted energy to consumer units.

Under certain conditions it may be suitable to let the sea bed base member and possibly the sink weight member be subjected to puncture in order to pump in air in connection with shifting of location and positioning.

The present invention can be used in a number of ways in addition to those already indicated, and typical fiels of use for the device, according to the present invention, will thus be e.g. conversion of wave energy to electric power inside the device proper as installed in the sea, in the form of a light buoy, or by bringing ashore electric power and/or pressurized fluid. Water may circulate through fish-farming installations and water and/or air can be transported from the surface and to the sea bottom, and water can be transported and listed to e.g. desalination installations. The device can also be used as a simple pressurized air compressor.

A substantial difference from the prior art is that the buoy and cylinder are the wave movable parts and that this feature enables focusing of water flow in the wave into the cylinder and thereby increasing substantially the pump efficiency. This focusing feature also functions as a pressure creating pump without piston function.

A further substantial difference from the prior art is the possibility of locating the center of gravity of the buoy at the bottom of the cylinder. This contributes to phase control, self-aligning to vertical position and eliminates momentum stress on the piston rod. Further, it has previously not been shown that the piston rod has installed thereon a submarine buoy, and that the piston rod represents a fluid conducting pipe for bringing ashore fluid or a cable.

It has further been shown a novel positioning method which is serviced from land by means of a sheave mounted on the anchor means and a winch located on land.

The piston function with freely floating balls having calibrated buoyancy or sink-weight is not prior art in this context. This is quite important for automatic phase control and represents a non-wear valve function.

It is also shown that wave operated pumps according to the invention can be cooperated with a tidal water driven circulation through basins and energy recovery apparatus.

It may be suitable to use a further safety wire 108 between the device and the sea bed case member 40 and to let that wire have an adjusted length, so that it is activated following damage when the device surfaces as shown in FIG. 13.

I claim:

1. A device for buoy-based power apparatus where a surface-related buoy coacts with a cylinder/piston arrangement which is connected to the sea bed, where said buoy is connected to the cylinder of said arrangement, and where a piston part of the arrangement is provided with means enabling fluid flow therethrough, said device upon the upward movement of the buoy being arranged to form a pressure chamber in that part of said cylinder which is adjacent the lower face of the piston and surrounds a piston rod of said piston, and simultaneously causing suction of fluid into that part of the cylinder which is adjacent the top face of the piston, said fluid being shifted from a suction part of said cylinder to a pressure side of the cylinder during downward movement of the buoy/cylinder, either the piston rod being connected with a bottom base member on the sea bed in an articulated or flexible manner, the piston rod having mounted thereon a submarine buoy having sufficient buoyancy to withstand the pressure and frictional forces acting on the piston and piston rod upon the downward movement of the combination of the surface-related buoy and attached cylinder, or the lower end of the piston rod connecting with a sink weight member located in a bed means, the sink weight member having a heavier weight than the maximum buoyancy of the surface-related buoy, wherein the cylinder has an adjusted weight cast into the lower end and the piston rod is hollow to provide conduit for fluid or cable for converted energy out of the arrangement and to another installation.

2. A device for buoy-based water power apparatus where a surface-related buoy coacts with a cylinder/piston arrangement which is connected to the sea bed, where said buoy is connected to the cylinder of said arrangement, and where a piston part of the arrangement is provided with means enabling fluid flow therethrough, said device upon the upward movement of the buoy being arranged to form a pressure chamber in that part of said cylinder which is located on the skirt side of the piston and surrounds a piston rod of said piston, and simultaneously causing suction of fluid into that part of the cylinder which is adjacent the top face of the piston, said fluid being shifted from a suction part of said cylinder to a pressure side of the cylinder during downward movement of the buoy/cylinder, either the piston rod being connected with a bottom base member on the sea bed in an articulated or flexible manner, the piston rod having mounted thereon a submarine buoy having sufficient buoyancy to withstand the pressure and frictional forces acting on the piston and piston rod upon the downward movement of the combination of the surface-related buoy and attached cylinder, or the lower end of the piston rod connecting with a sink weight member located in a bed means, the sink weight member having a heavier weight than the maximum buoyancy of the surface-related buoy, wherein the cylinder has an adjusted weight cast into the lower end, that there is arranged a fluid supplying conduit from the pressure chamber in the cylinder to the buoy, that the conduit has mounted therein a back-pressure valve before the conduit is connected to energy conversion equipment located in or on the buoy, said equipment producing electric current to a signaling device located on the buoy.

3. A device according to claim 1 wherein said enabling means include valve balls arranged to be influenced by the fluid flow to open and close relative to a ball bed in said piston by letting the balls have an adjusted buoyancy or sink weight.

4. A device according to claim 2 wherein said enabling means include valve balls arranged to be influence by the fluid flow to open and close relative to a ball bed in said piston by letting the balls have an adjusted buoyancy or sink weight.

5. A device according to claim 1 or 3 wherein air is permitted into the cylinder part of said arrangement via a snorkel located on the surface-related buoy and that air and water are mixable as required.

6. A device according to claim 4 wherein air is permitted into the cylinder part of said arrangement via a snorkel located on the surface-related buoy and that air and water are mixable as required.

7. A device according to claim 1 or 3 wherein water flow focusing means are arranged on the surface-related buoy and/or the cylinder, said means collecting and accelerating the upward moving water flow of the wave into the inlet chamber via inlet holes, slots and/or conduits.

8. A device according to claim 2 or 4 wherein water flow focusing means are arranged on the surface-related buoy and/or the cylinder, said means collecting and accelerating the upward moving water flow of the wave into the inlet chamber via inlet holes, slots and/or conduits.

9. A device according to claim 7 wherein the upward facing surface of the surface-related buoy has cavity or vessel means and that drainage conduits extend from said cavity or vessel means to the outside of said buoy.

10. A device according to claim 8 wherein the upward facing surface of the surface-related buoy has cavity or vessel means and that drainage conduits extend from said cavity or vessel means to the outside of said buoy.

11. A device according to claim 1 or 3 wherein the bottom base member is provided with a wire guide such as a sheave, one end of the wire being attached to a lower portion of the piston rod and its other end being connected to a winch device or the like located ashore.

12. A device according to claim 2 or 4 wherein the bottom base member is provided with a wire guide such as a sheave, one end of the wire being attached to a lower portion of the piston rod and its other end being connected to a winch device or the like located ashore.

13. A device according to claim 11 wherein a safety wire which is arranged between the lower part of the piston rod and the bottom base member, is activated when the piston rod with the submarine buoy have reached surface position subsequent to main anchoring being detached.

14. A device according to claim 12 wherein a safety wire which is arranged between the lower part of the piston rod and the bottom base member, is activated when the piston rod with the submarine buoy have reached surface position subsequent to main anchoring being detached.

15. A device according to claim 1 or 3 wherein the bottom facing part of the sink weight member is spherical and is located in a bed means of the bottom base member where the bed means has a radius of curvature which is greater than the radius of curvature of the sink weight member.

16. A device according to claim 2 or 4 wherein the bottom facing part of the sink weight member is spherical and is located in a bed means of the bottom base member where the bed means has a radius of curvature which is greater than the radius of curvature of the sink weight member.

17. A device according to claim 1 or 3 wherein the pressure chamber at the bottom of the cylinder has mounted thereon extra water suction conduits with back-pressure valves which open upon downward movement of the buoy/cylinder.

18. A device according to claim 2 or 4 wherein the pressure chamber at the bottom of the cylinder has mounted thereon extra water suction conduits with back-pressure valves which open upon downward movement of the buoy/cylinder.

19. A device according to claim 1 or 3 wherein a connection between the surface-related buoy and the cylinder is extended and that the cylinder part accordingly is submerged further down, the cylinder having mounted thereon upward facing focusing means enabling increased water flow into the inlet chamber upon the upward movement of the cylinder.

20. A device according to claim 4 wherein a connection between the surface-related buoy and the cylinder is extended and that the cylinder part accordingly is submerged further down, the cylinder having mounted thereon upward facing focusing means enabling increased water flow into the inlet chamber upon the upward movement of the cylinder.

21. A device according to claim 1 or 3 wherein energy conversion equipment is arranged in cooperation with said enabling means, said equipment having a turbine arranged to operate during the upward stroke of the surface-related buoy in open or closed system, valve means controlling the flow through the piston.

22. A device according to claim 4 wherein energy conversion equipment is arranged in cooperation with said enabling means, said equipment having a turbine arranged to operate during the upward stroke of the surface-related buoy in open or closed system, valve means controlling the flow through the piston.

23. A device according to claim 1 or 3 wherein energy conversion equipment is arranged in or on the piston or a piston rod thereof, said equipment having turbine arranged to operate in a closed system both upon upward stroke and downward stroke of the buoy by arranging the turbine propeller to turn in the same direction independent of the direction of fluid flow through the piston.

24. A device according to claim 4 wherein energy conversion equipment is arranged in or on the piston or a piston rod thereof, said equipment having turbine arranged to operate in a closed system both upon upward stroke and downward stroke of the buoy by arranging the turbine propeller to turn in the same direction independent of the direction of fluid flow through the piston.

25. A device according to claim 1 or 3 wherein desalination equipment, such as of the type using reverse osmosis, is arranged in the piston, and that sea water is let in via back-pressure valves directly into the pressure chamber, from which the water is pressed through the desalination equipment in the piston, wherefrom desalinated water is brought ashore via the piston rod, and polluted water is transported back to the sea via the top face of the piston and its adjacent chamber.

26. A device according to claim 4 wherein desalination equipment, such as of the type using reverse osmosis, is arranged in the piston, and that sea water is let in via back-pressure valves directly into the pressure chamber, from which the water is pressed through the desalination equipment in the piston, wherefrom desalinated water is brought ashore via the piston rod, and polluted water is transported back to the sea via the top face of the piston and its adjacent chamber.

27. A device according to claim 1 or 3 wherein the piston rod has two mutually separate fluid escape conduits where fluid upon upward movement of the buoy is caused to flow into the device via a first conduit in the piston rod and further into the topmost suction chamber of the cylinder, and further through back-pressure valves in the piston and into the pressure chamber on the piston rod side of the piston, fluid being compressed and forced out through a second of said conduits in the piston rod, said conduits being connected with energy converting equipment which is arranged in association with the submarine buoy, the sink member or at a distance therefrom in recirculating pipe/hose system.

28. A device according to claim 4 wherein the piston rod has two mutually separate fluid escape conduits where fluid upon upward movement of the buoy is caused to flow into the device via a first conduit in the piston rod and further into the topmost suction chamber of the cylinder, and further through back-pressure valves in the piston and into the pressure chamber on the piston rod side of the piston, fluid being compressed and forced out through a second of said conduits in the piston rod, said conduits being connected with energy converting equipment which is arranged in association with the submarine buoy, the sink member or at a distance therefrom in recirculating pipe/hose system.

29. A device according to claim 1 or 3 wherein linear induction generator means are arranged on the piston rod and in a guide tube for said piston rod, said piston rod being further extended from the top face of the piston and up through the surface-related buoy on which said guide tube is arranged.

30. A device according to claim 4 wherein linear induction generator means are arranged on the piston rod and in a guide tube for said piston rod, said piston rod being further extended from the top face of the piston and up through the surface-related buoy on which said guide tube is arranged.

31. A device according to claim 1 or 3 wherein linear induction generating means are arranged on any slide face between the pistons/piston rod and the cylinder.

32. A device according to claim 4 wherein linear induction generating means are arranged on any slide face between the pistons/piston rod and the cylinder.

33. A device for a buoy based water power apparatus according to claim 1 wherein the surface-related buoy coacts with a cylinder/piston arrangement which is connected to the sea bed and where the piston part of the arrangement is provided with valve means permitting flow of water therethrough, wherein the surface-related buoy and/or cylinder has water flow focusing means, which upon the upward movement of the wave will guide pressurized water into an inlet chamber of the cylinder, that the pressurized water is further conveyed through the piston and directly into the piston rod via a back-pressure valve and that the piston has a conduit with back-pressure valve, said conduit communicating with the inlet chamber and a chamber located around the piston rod.

34. A device for a buoy-based wave power apparatus according to claim 1 wherein the buoy and/or cylinder has focusing means which upon the upward movement of the wave focus and pressurize water into the cylinder.

35. A device for a buoy-based wave power apparatus according to claim 2 wherein the buoy and/or cylinder has focusing means which upon the upward movement of the wave focus and pressurize water into the cylinder.

36. A device according to claim 21 wherein said device forms a part of a wave operated pump driven and tidal water driven circulating system having one or more basins with fresh sea water, the energy of the sea water circulated in the system being converted into electric energy, the cylinder of the cylinder/piston arrangement of said device being connected via a back-pressure valve to a supply pipe located on the sea bed and leading to said basins, said pipe having a back-pressure valve at the end located most remotely in the sea, deep water being pressed by means of said device via said pipe into said basins wherefrom water is guided back to the sea via siphon conduit means having back-pressure valve means and energy converting equipment mounted therein.

37. A device according to claim 36 wherein deep water taken to a reserve basin via said supply pipe at flood tide phase flows back to a production basin at ebb tide phase.

* * * * *

UNITED STATES PATENT AND TRADEMARK OFFICE
CERTIFICATE OF CORRECTION

PATENT NO. : 5,701,740
DATED : December 30, 1997
INVENTOR(S) : Torger Tveter

It is certified that error appears in the above-indentified patent and that said Letters Patent is hereby corrected as shown below:

In Column 1, line 7, change "wit" to --with--

In Column 2, line 18, change "a" to --an-- line 33, change "iva" to --via-- line 38, change "has" to --have-- line 63, delete the word "to"

In Column 3, line 50, change "listing" to --lifting-- line 51, change "preventing" to --prevention--

In Column 4, line 60, change "camber" to --chamber--

In Column 5, line 8, change "radium" to --radius--

In Column 6, line 47, change "was" to --wave--

In Column 7, line 31, change "listed" to --lifted-- line 58, change "case" to --base--

UNITED STATES PATENT AND TRADEMARK OFFICE
CERTIFICATE OF CORRECTION

PATENT NO. : 5,701,740
DATED : December 30, 1997
INVENTOR(S) : Torger Tveter

It is certified that error appears in the above-identified patent and that said Letters Patent is hereby corrected as shown below:

In Column 12, line 16, change "21" to --1--

Signed and Sealed this

Twelfth Day of May, 1998

*Attest:*

*Attesting Officer*

BRUCE LEHMAN

Commissioner of Patents and Trademarks